United States Patent [19]
Pitner

[11] 3,792,624
[45] Feb. 19, 1974

[54] PINION ASSEMBLY DEVICE IN PARTICULAR FOR A RACK STEERING MECHANISM

[75] Inventor: Alfred Pitner, Paris, France

[73] Assignee: Nadella, Rueil-Malmaison, France; a part interest

[22] Filed: Mar. 13, 1972

[21] Appl. No.: 233,938

[30] Foreign Application Priority Data
Mar. 15, 1971 France ................................ 7108940

[52] U.S. Cl. ...................... 74/422, 74/498, 308/174
[51] Int. Cl. ............................ B62d 3/12, F16h 1/12
[58] Field of Search ...... 74/498, 422; 308/174, 213; 64/17A

[56] References Cited
UNITED STATES PATENTS
3,178,907 4/1965 Lyons .................................. 64/17 A
3,421,387 1/1969 Adams .................................. 74/498
3,529,876 9/1970 Pitner ............................. 308/213 X Primary Examiner—Allan D. Herrmann
Attorney, Agent, or Firm—Robert E. Burns; Emmanuel J. Lobato

[57] ABSTRACT

Device comprising a pinion with a rack, in particular for a vehicle rack and pinion steering mechanism. A radial rolling bearing journals one portion of a shaft element having the pinion in a bore of a case. The elongate rolling members of the bearing bear at their ends axially against a radial flange of the ring of the bearing and against a continuous face associated with and in fixed relation to the pinion. A second rolling bearing comprising elongate rolling members contained in a cup journals an end portion of the shaft element in the bore of the case. A radial face on the cup serves directly or indirectly as an abutment for a corresponding face on the shaft element.

A method and an apparatus are disclosed for producing the device.

10 Claims, 5 Drawing Figures

3,792,624

PINION ASSEMBLY DEVICE IN PARTICULAR FOR A RACK STEERING MECHANISM

The invention relates to a device comprising a pinion, in particular for vehicle rack and pinion steering mechanisms comprising a shaft element the respective ends of which are journalled in a case through the medium of two bearings between which the pinion is located and which are capable of performing functions of axial abutments in both directions for the assembly consisting of the shaft element and the pinion.

In the application of the device to a rack and pinion steering mechanism and like applications, the axial abutment function, which principally results from the usual inclination of the teeth of the rack relative to the axis of the shaft element, is performed in accordance with present arrangements by two ball bearings or by two needle bearings of the combined radial and axial type. In either case, the construction is relatively complicated and expensive.

An object of the invention is to provide a simple, smaller and cheaper arrangement.

The invention provides a pinion assembling device wherein, at the entrance end of the case the rolling bearing is a radial bearing which comprises a ring fixed to the case and containing the needles or rollers which may be guided by a cage and bear axially at their respective ends against a radial flange of the ring and against a continuous face related to the pinion, the other rolling bearing comprising a cup having needles or rollers and also fixed to the case and having a radial face which serves, directly or indirectly, as an abutment for a corresponding face of the shaft element.

This device affords, as retaining faces for the pinion and shaft element assembly, firstly a radial face of the needle cup in accordance with an arrangement which is conventional in particular in universal joints or in accordance with the French Pat. No. 1,401,267 or the U.S. application Ser. No. 217,466 filed Jan. 13, 1972 and, secondly, a radial edge of the needle bearing ring, for example in accordance with the teaching of French Pat. No. 1,518,002. The sliding friction thus provided, at least in the entrance bearing, in contact with faces substantially perpendicular to the axis of rotation, and of course treated so as to possess suitable hardness, is perfectly permissible owing to the fact that there results only an efficiency loss which is negligible compared to the rolling friction owing to the low magnitude of the forces in the axial direction.

However, the device just defined can only operate correctly if the rolling bearing at the entrance of the case has provided therefor a positive but non-excessive axial clearance. This condition is not as easy to satisfy as it might at first sight seem, since if an assembly is made with conventional means by first fitting the entrance rolling bearing around the shaft element which is placed in position in the case and carries the pinion, and then fitting, at the other end, the cup around the free end of the shaft element, the axial thrust resulting from the latter operation may have for result to eliminate the axial clearance for the entrance rolling bearing. This danger exists even if the cup is axially positioned precisely relative to a reference face of the case, since the tolerances of the various parts to be assembled are such that the assembly may be too tight or too loose, and although it is relatively easy to release the assembly axially by pressure or a blow when the rolling bearings have massive rings, this solution cannot be contemplated when the rolling bearings have thin sheet metal rings obtained by a drawing operation.

This drawback may be overcome by effecting a "matching" consisting in measuring the axial dimensions of the parts and making a selection of groups which afford a correct axial clearance in the assembly. This matching is however slow, delicate and liable to errors and an automatic assembly in an assembly line is impossible.

Consequently, another object of the invention is to provide a method for producing the assembling device comprising engaging the entrance rolling bearing on the corresponding end portion of the shaft element provided with the pinion, disposing the case around the other end portion of the shaft element and around the pinion, holding stationary the shaft element in a first support by putting the respective ends of the entrance rolling bearing in clearance-free contact with the pinion and with a movable second support, under a calibrated force, retained on the first support and capable of movement which is limited by an abutment and equal to the axial clearance to be obtained for the rolling bearing, constraining the shaft element and the case to undergo a relative axial displacement in the course of which the entrance rolling bearing is fitted in the case and the movable second support is moved to its abutment, whereby the rolling bearing is moved away from the pinion and provides the desired axial clearance, and fitting the needle cup in the case around the other end portion of the shaft element by applying its radial face directly or indirectly on the corresponding face of the shaft element while maintaining the movable second support on its abutment.

It is advantageous to arrange that the position of the movable support, before fitting the entrance rolling bearing, be ensured by a resiliently yieldable action in opposition to which the movement is effected, the movement being limited by an abutment and defining the axial clearance.

This method affords a predetermined axial clearance which is irrespective of the manufacturing and assembly tolerances.

The invention will be more easily understood from the ensuing description with reference to the accompanying drawings, in which.

Figure 1:
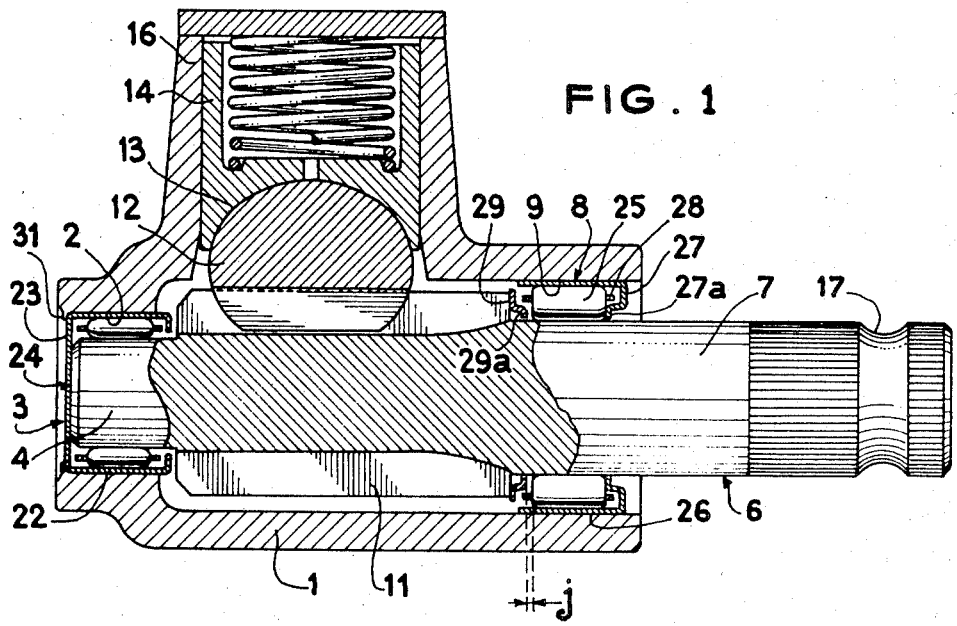
FIG. 1 is an axial sectional view of a case of a rack and pinion steering mechanism whose shaft element is assembled or mounted by means of radial needle bearings.

The case 1 of the steering mechanism shown in FIG. 1 is open at both ends and defines a stepped aperture or bore whose part 2 of small diameter serves as a housing for a radial rolling bearing 3 for the mounting or assembly of the corresponding end portion 4 of the shaft element 6. The remainder of the bore receives the main part of the shaft element whose region 7 of larger diameter is journalled in an entrance rolling bearing 8 engaged in the larger part 9 of the bore. Between the two bearings 3, 8, there is formed on the shaft element a rack pinion 11 which meshes with a rack 12 whose face 13 opposed to the teeth is crowned or curved and in sliding contact with a guide block 14 which is slidably engaged in a radial cylindrical portion 16 of the case and resiliently applied against the rack.

The end of the shaft element 6 which extends out of the case has a recess 17 for receiving a bolt engaged tangentially for fixing a split collar of a universal joint yoke which connects the shaft element 6 to an adjacent part of the steering mechanism for the purpose of rotating the rack pinion 11.

Whereas the needle bearing 3 fixed to the end portion 4 of the shaft element 6 comprises a cup 22 which is fitted in the bore 2 and has an end wall 23 which abuts the end face 24 of the shaft element, the entrance rolling bearing 8 comprises a ring 26 which is fitted in the bore 9 and has at the end thereof remote from the pinion 11 a radial flange or ledge 27 which axially retains the needles 25 contained in the cage 28. At the other end, the ring 26 is open so that the needles may come in contact with one of the faces of a washer 29 which has its other face fixed to the end of the pinion 11. This bearing 8 is constructed in accordance with the teaching of French Pat. No. 1,518,002, that is to say, axial forces may be transmitted by the pinion 11 to the radial flange 27 which performs the function of an abutment or thrust face through the agency of the needles 25. For this purpose, the radial flange 27 and the washer 29 have a Z-shaped radial section which affords support regions 27 a, 29a contacting the needles, these two regions being axially aligned, that is, at the same distance from the axis of rotation.

To render the fixing of the cup 22 and the ring 26, achieved by fitting them in the bores 2 and 9, more secure, retaining means are normally provided. A formed-over or upset portion 31 is shown as an example of retaining means for the cup 22. With regard to the bearing 8, neither retaining means nor other accessories, such as sealing means, have been shown for reasons of simplification.

Figure 2:
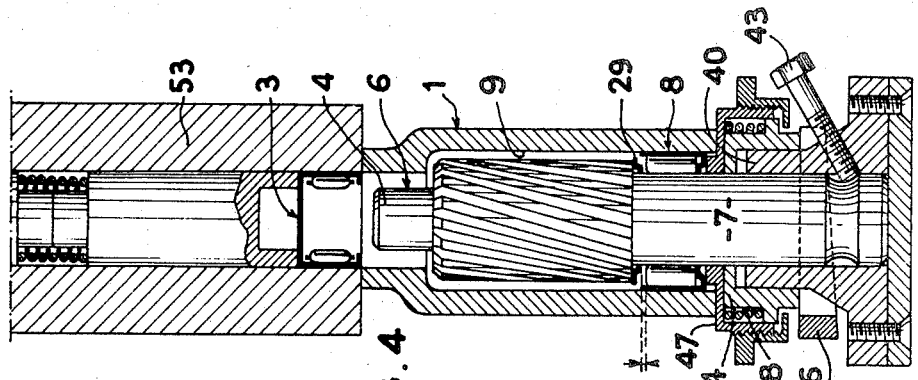
FIGS. 2–4 are diagrammatic axial sectional views of the main stages of the assembly of the bearings of the case shown in FIG. 1.
Figure 3:
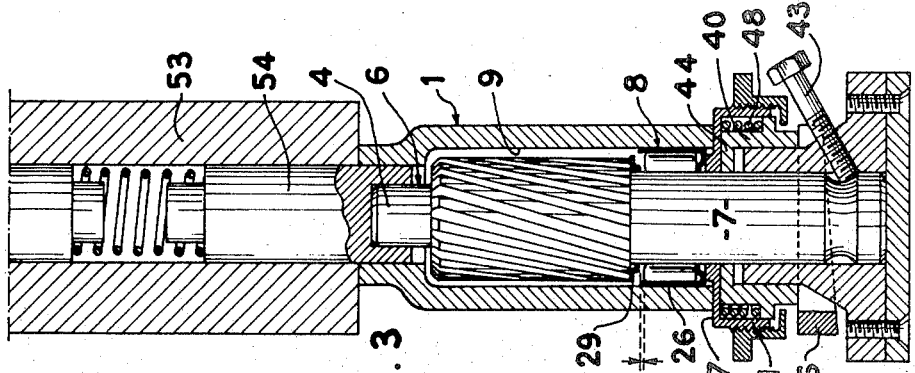
Figure 4:
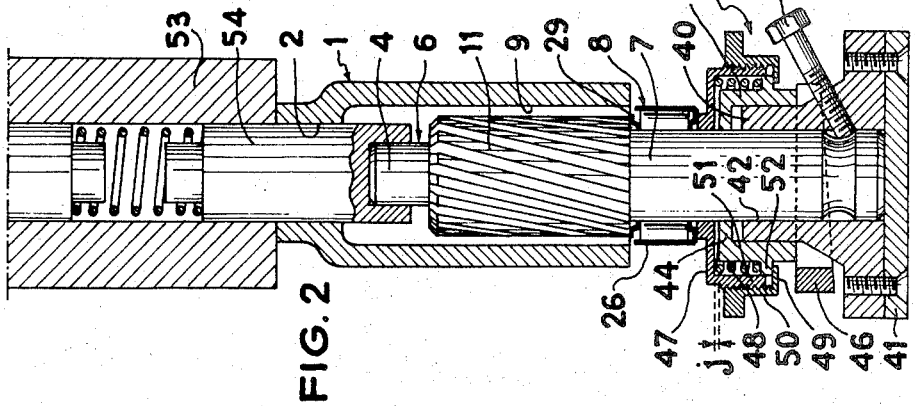

FIGS. 2-4 show an apparatus for assembling the device just described and adapted to provide between the radial rolling bearing 8 and the washer 29 secured to the rack pinion 11 a predetermined axial operational clearance. This apparatus comprises a mount 39 whose body 40 is rigidly mounted on a support 41. Fixed in a bore or aperture 42 in the body 40 is the end portion 7 of the shaft element 6 which is provided with the pinion 11 and the rolling bearing 8 mounted in adjacent relation to the pinion. The shaft element is fixed in position by an oblique bolt 43 screwed in the body 40 and tightened against the recess 17 of the shaft element. The end portion 7 of the latter extends firstly through the upper radially extending portion 44 of a sleeve 45, which is vertically slidable on the body 40 of the mount and can be locked in the desired axial position by means of a wedge 46, and secondly through a plate 47 which is axially movable and biased by a spring 48, coaxial with the sleeve, to a precise axial position defined by the position of a retaining collar 49 formed on the end of a ring 50 which is screwed on a skirt portion 51 of the plate 47 and bears against the underside of a radial projection 52 on the sleeve 45.

The assembly consisting of the shaft element 6 and the rack pinion 11 is enclosed in the case 1 which is retained by a mandrel 53 through which extends a plunger 54 whose lower end portion caps the upper end portion 4 of the shaft element and which is slidable in the bore 2 of the case 1 so as to afford a relative centering of the component parts.

In the position shown in FIG. 2, the spring 48 biases the plate 47 against the adjacent end of the bearing 8, the other end of the latter being applied without clearance against the washer 29 which is fixed to the end face of the pinion 11. The distance between the plane end 44 of the sleeve 45 of the plate 47, defined by the angular position of the ring 50 screwed on the skirt portion 51, is equal to the predetermined axial clearance j provided for the bearing 8.

In the following assembly stage (FIG. 3) the mandrel 53, which is for example part of a press, is urged downwardly under such conditions that the bore 9 of the case 1 slides along the bearing 8 whose ring 26 is consequently fitted in this bore, the lower end of the case finally bearing at the end of its travel against the plate 47 and urging the latter into contact with the abutment face 44 formed by the plane upper part of the sleeve. The bearing 8, which is displaced in this movement, therefore moves through a distance relative to the shaft portion 7 which is equal to the distance between the plate 47 and the abutment 44 so that the bearing 8 has the desired axial clearance j. When this clearance has been achieved, the mandrel 53 and the plunger 54 are removed and the needle cup 3 (FIG. 4) is introduced in the corresponding bore of the mandrel 53 and then urged into a fitted position in the bore 2 and around the end portion 4 of the shaft element 6, the pressure of the mandrel 53 on the case 1 being re-established.

The bearings have now been placed in position under conditions which ensure for the entrance bearing 8 the axial clearance j corresponding to normal operational conditions, this being achieved independently of the manufacturing tolerances of the different parts.

It will be understood that the functions of the bolt 43 and wedge 46, required for putting the apparatus in the working position, may be easily rendered automatic by the use of any equivalent means.

Figure 5:
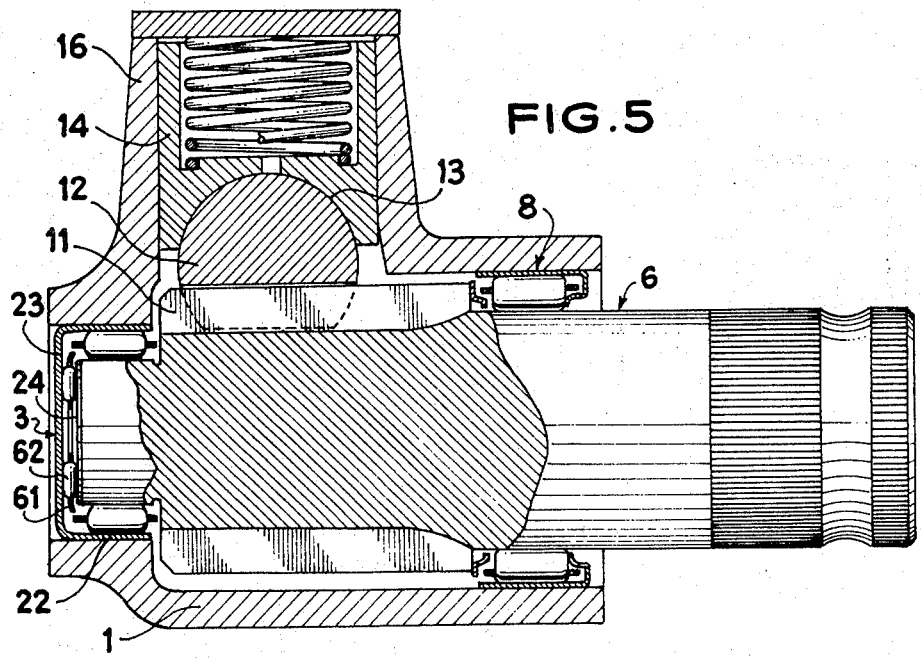
FIG. 5 is an axial sectional view of a modification of the case shown in FIG. 1.

In the embodiment shown in FIG. 5, a thrust or axial rolling bearing 61 having needles 62 is interposed between the end face 24 of the end portion 4 of the shaft element and the end wall 23 of the cup 22 in accordance with the teaching of French Pat. application No. 71 04 637. Further, the crowned or curved convex face 13 of the rack 12 is part-circular instead being elliptical.

Having now described my invention what I claim as new and desire to secure by Letters Patent is:

1. A rack and pinion device in particular for a vehicle rack and pinion steering mechanism, comprising a case defining a bore having an entrance end and second end, a rack longitudinally movable in the case, a shaft element having two end portions, two rolling bearings respectively mounted on the end portions of the shaft element, a pinion integral with the shaft element and axially located between the bearings and meshed with the rack, the bearings being respectively mounted in the bore at the entrance end and second end of the bore and being capable of performing functions of axial abutments in both axial directions for the pinion and the shaft element, the bearing at said entrance end being a radial bearing which comprises elongate cylindrical rolling members, a ring having a radial flange and in fixed relation to the case and containing the rolling members, means defining a continuous face axially supported by the pinion, the rolling members having ends bearing axially against respectively the radial flange of the ring and the continuous face, the other rolling bearing comprising a cup having a radial face and containing elongate cylindrical rolling members and in fixed relation to the case, means defining an abutment including the radial face of the cup, the shaft element having a face which axially bears against the abutment.

2. A device as claimed in claim 1, comprising a cage for the rolling members of the bearing at said entrance end of the bore.

3. A device as claimed in claim 1, wherein the cup has a transverse end wall defining said radial face of the cup.

4. A device as claimed in claim 1, comprising a support washer mounted on the pinion and defining said continuous face.

5. A device as claimed in claim 1, comprising axial retaining means for the ring and the cup which are in fixed relation in the bore of the case.

6. A device as claimed in claim 1, wherein the ring and the cup are of cold-drawn thin sheet metal.

7. In a rack and pinion device in particular for a vehicle steering mechanism, comprising a case, a rack movable in the case, the case defining a bore, a shaft disposed in the bore and defining a pinion which is in mesh with the rack and has a first end portion extending out of the case and defining means for connecting the shaft to drive means, a cylindrical second end portion opposite to the first end portion and located within the bore and a cylindrical intermediate portion adjacent the pinion and intermediate the pinion and the first end portion, the second shaft portion defining a surface in a plane perpendicular to the shaft; the combination of the following features : the bore is a throughway bore in the case and has a first cylindrical bore portion surrounding said second shaft portion and a second cylindrical bore portion surrounding said intermediate shaft portion, the pinion having a diameter larger than the diameter of said intermediate shaft portion and having a surface contained in a plane perpendicular to the shaft, a washer mounted on said intermediate shaft portion and bearing axially against said end of the pinion, a first rolling bearing interposed between said second shaft portion and said first end portion of the bore and comprising a ring having a radial face in axial engaging relation to said surface of the shaft to axially retain the shaft and elongate cylindrical rollers in contact with said second shaft portion, a second rolling bearing comprising an outer bearing ring engaged in said second bore portion and elongate rolling members interposed between said engaging the outer ring of the second bearing and said intermediate shaft portion, the outer ring of the second bearing having an inner flange, the rolling members having ends capable of bearing axially against the washer and the flange respectively, and means for maintaining the outer rings of the first bearing and second bearing in axial position in the bore.

8. A device as claimed in claim 7, wherein said second cylindrical bore portion has a diameter larger than said first cylindrical bore portion.

9. A device as claimed in claim 7, wherein each of the first and second bore portions has a constant diameter throughout the length of the bore portion to the outside of the case and said means for maintaining the two bearing outer rings axially in position comprise projecting means which project radially inwardly of the bore portions and are of a type including a result of alteration in the surface of the bore portions.

10. A device as claimed in claim 7, wherein each of the first and second bore portions has a constant diameter throughout the length of the bore portion to the outside of the case and said means for maintaining the two bearing outer rings axially in position comprise projections from the bore portion surface constituted by a deformation of said surface.

* * * * *